Patented Jan. 18, 1944

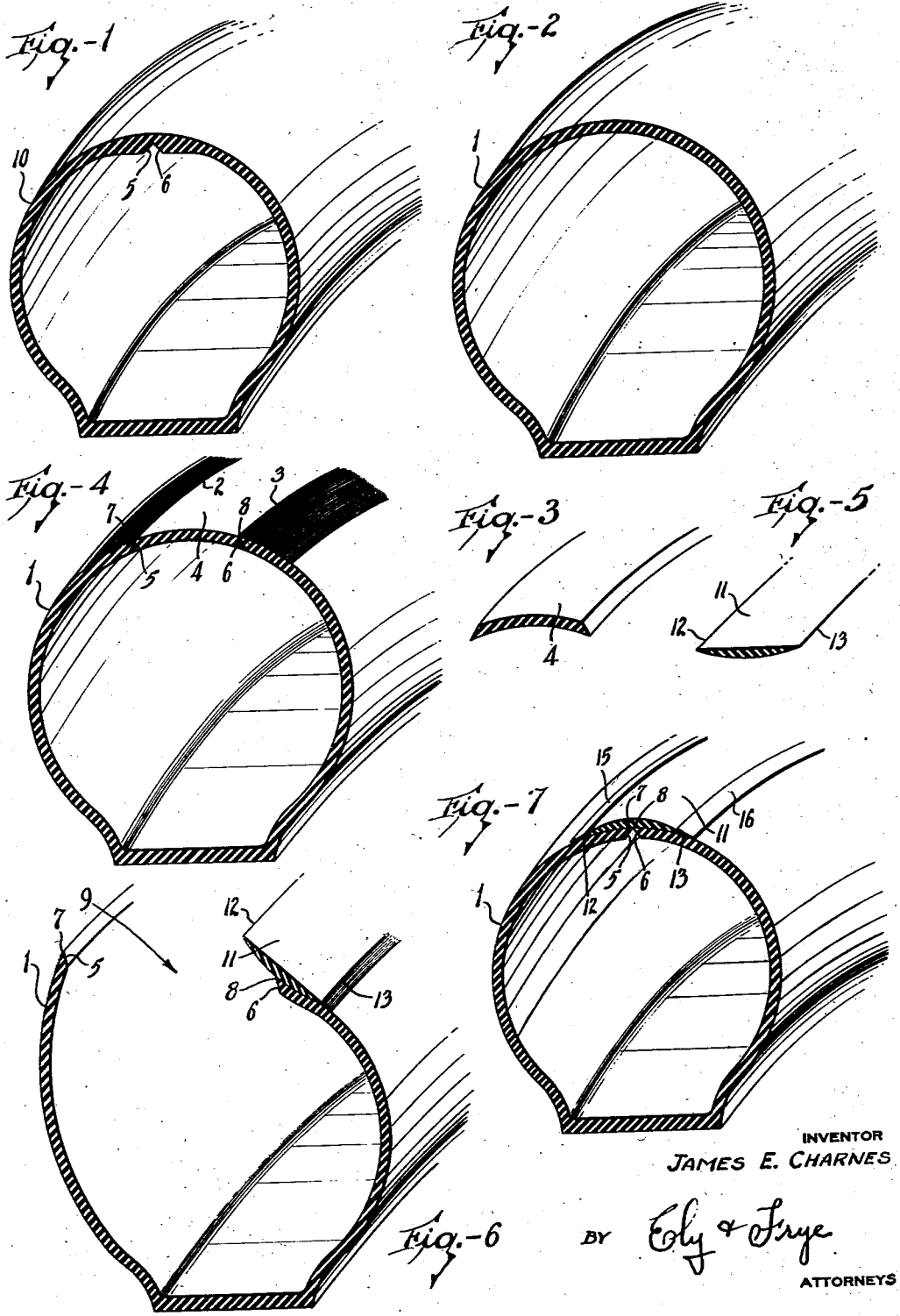

2,339,559

UNITED STATES PATENT OFFICE 2,339,559

METHOD OF RESTORING CURING BAGS

James E. Charnes, Akron, Ohio, assignor to The Firestone Tire & Rubber Company, Akron, Ohio, a corporation of Ohio Application March 27, 1942, Serial No. 436,407

3 Claims. (Cl. 154—42)

This invention relates to the method of restoring curing bags for pneumatic rubber tires and relates especially to rebuilding such bags utilizing bags that have been previously used to cure tires.

Pneumatic rubber tires, such as automobile, airplane and truck tires, are commonly cured on thick rubber curing bags. The curing bags are in the form of annular tubes and are equipped with a valve through which a pressure medium passes to supply internal pressure within the bag whereby the bag is expanded and presses the tire, in which it has been placed, outwardly against a tire mold in which position the tire is molded and cured. The steps taken in curing tires on curing bags are too well known to require a detailed discussion. Nevertheless, tire bags have been and still are a serious problem to the rubber industry. Such bags, to be satisfactory, must be capable of withstanding the heat of many tire cures with the outside surface of the bag exposed to the migration of curing agents such as sulphur, and the inside surface of the bags exposed to the pressure medium such as steam and air. The internal pressure ordinarily is high, as for example 250# of air pressure. The curing temperature is also high, as for example 310° F. The curing bag is subjected to movement in expanding the tire during the molding of the tire and it is subjected to extreme flexing during its insertion into the tire. All these and other factors hasten the deterioration and failure of the bags as is well known by those familiar with the art. The problem of providing satisfactory curing bags has been increased and complicated in recent years by the advent of very large tires such as 21.00—24. In tires of this size the "bagging," as the insertion of the curing bag into the tire is called in the art, is impossible if the heretofore common thick-walled curing bag is used. This is because the bag is too bulky to be forced through the relatively small tire bead of 24" bead diameter. Consequently, it has been necessary for manufacturers of such tires to resort to comparatively thin-walled curing bags. In practice tires are ordinarily given a molding stretch of approximately eight percent. The curing bag before it has been used and in an unexpanded condition is of a cross-sectional contour length of approximately four percent less than when it is expanded during the molding and curing of a tire. Thus it will be seen that in "bagging," it is necessary to crowd such curing bag to get it into a tire. A thick-walled bag during the "bagging" will stretch the tire somewhat and will resist folding or buckling, but a thin-walled bag will not. Therefore it is necessary, when a thin bag is to be used that the cross-sectional contour length of the bag be smaller than the space it is to occupy in the bagging operation. Otherwise the thin walls will buckle causing a corresponding buckle in a tire in which the bag is being used. In practice the contour of the curing bag is established by the size of its curing mold and accordingly the bag mold is designed to give a bag with a peripheral cross-sectional contour small enough to work satisfactorily for the first tire in which it is to be used. But, since a curing bag remains in its expanded condition during the cure of a tire and since such bags are composed of a type of rubber compound that takes a permanent set in high temperatures readily, the curing bag does not come back after a tire cure to its original size but remains substantially the size it took during the tire curing operation.

From the above discussion it will be seen that curing bags of the thin wall type heretofore known could be used for only one tire cure. It is an object of this invention to keep a relatively thin-walled pneumatic tire curing bag in condition for repeated use in curing large tires by converting such bag that has been previously used into a bag of smaller contour thereby reducing the cost of curing tires and saving rubber during the present national emergency.

Other advantages and objects will be manifest as the specification proceeds.

Referring to the drawing:

Fig. 1 is a perspective view of a short section of a curing bag involving the invention;

Fig. 2 is the same as Fig. 1 except it shows the bag as it appears after it has taken a permanent set in use in curing a tire and before it has been converted into a new bag of reduced contour shown in Fig. 1;

Fig. 3 is a perspective view of a short section of a longitudinal strip removed from the crown of the tread portion of the curing bag shown in Fig. 2;

Fig. 4 is the same as Fig. 2 but indicating the relative position of the strip shown in Fig. 3 just before it was removed from the curing bag.

Fig. 5 is a perspective view of a short section of a longitudinal strip used in the construction of the bag shown in Fig. 1;

Fig. 6 is a view showing the strip shown in Fig. 5 in position attached to one edge of the opened crown portion of the curing bag shown in Figs. 2 and 4 preparatory to closing said opened crown by a splicing operation;

Fig. 7 is the same as Fig. 6 except the opening has been closed and the splicing operation has been completed and the bag is in form to be cured in a curing bag mold.

In its original form the rubber curing bag, which after being used in curing a tire is to become a part of a new bag, may be of any approved construction. It may be extruded in a continuous length, cut to proper length, a curing bag valve inserted, spliced and cured in a mold. Or it may be drum built or built in any other manner found satisfactory. Since the several common methods of building ordinary curing bags are well understood by those familiar with the art, a detailed description of such methods is deemed unnecessary for a complete disclosure of the present invention.

In manufacturing a curing bag by the method comprising this invention, the curing bag 1, shown in Fig. 2, is a rubber curing bag of a thin wall type that has been in service and has gone through at least one tire cure and has become too large in contour to be used in bagging another tire as explained hereinabove. The outside peripheral cross-sectional contour of the bag 1 is measured to determine its length. From this length is subtracted the outside peripheral cross-sectional length of bag 1 as it was after it was molded and cured in its curing mold and before it was used in curing a tire. The difference between these figures will give the amount the cross-sectional contour length of the bag 1 must be reduced to return it to its original length. To illustrate, if bag 1 had an outside cross-sectional contour length of 54" after its cure in its mold and before it was used in the curing and molding of a tire, and it took a permanent set after being used for that purpose to a said contour length of 60" it has grown 6" and that amount will have to be taken from the said length in order to return the curing bag to its original outside cross-sectional contour length. Having determined that 6" is the amount the bag has grown, the next step is to cut a strip 4 from the crown of the enlarged bag. This is done by using a pair of dividers set at a 6" opening and marking lines 2 and 3 on the crown of said enlarged bag 1 as indicated in Fig. 4. The strip 4 is removed from said bag 1 by making under cuts through the bag on said lines. These cuts form faces 5 and 6 respectively, each of which terminates with the outside surface of the bag 1 to form sharp edges 7 and 8 between which edges an opening 9 occurs due to the removal of the strip 4. The actual construction of the new bag 10 is now ready to begin and the first step in this is to buff and cement the surface of the opened bag 1 a predetermined distance back from the edges 7 and 8 preparatory to joining these edges to form said bag 10 with an outside cross-sectional contour length of 54", this length being the same as that of bag 1 before it was used in curing one or more tires. In joining the edges 7 and 8 a relatively thick gum strip 11 is employed. This gum strip is formed by extruding and is composed of unvulcanized curing bag compound. One side of the strip is flat and the opposite side is convex the two sides terminating in common thin edges 12 and 13. After the cement on the buffer surface has dried the strip 11 is applied with its convex surface down, the center of the strip being aligned with the edge 8 of the opening 9 and extending backward from this edge, the strip being in firm contact with the cemented area from the strip's center to its thin edge 13 and extending completely around the circumference of the curing bag, it being put into position manually and being spliced in any usual manner to form a continuous strip along said edge 8. After the strip 11 has been placed in position it forms an extension to the edge 8 which extension is utilized to facilitate the joining of the edges 7 and 8. The joining of these edges is accomplished by a manual operation wherein the workman raises the extending edge of the gum strip 11 out of the way while he presses the edges 7 and 8 progressively into contact and as these edges contact the workman presses the extended edge of said gum strip against the cemented area of the bag 1 which lies adjacent to the edge 7 thus providing a bond which holds the sharp edges 7 and 8 in contact. This splicing operation will be well understood by those familiar with the art, and it is to be understood that the strip 11 may be joined when it meets itself by either a butt or lap splice and that if desired such splices of the said gum strip may be reinforced by a cross-gum strip of the same or different compound as that of the strip 11.

Thin gum strips 15 and 16 are centered or lapped over the edges 12 and 13 of the gum strip 11. These gum strips extend to the edge of the buffed area of the bag and insure a smooth molded surface on the finished bag after molding. The composite assembly is now ready for molding and curing in a curing bag mold. As the outside cross-sectional contour length of the new bag formed by said composite assembly is the same as that of the bag 1 before said bag 1 was used in curing a tire or tires the original curing bag mold used for the bag 1 is satisfactory for the said new bag and accordingly the said composite assembly is molded and cured in such original mold to form the finished bag 10.

While I have illustrated the invention, giving as one step in the process the removal of a strip from the tread portion of a curing bag, it is to be understood that the invention contemplates that such strip may be removed from the base of a curing bag or at any portion intermediate the base and tread portions.

From the foregoing it will be evident that there has been provided novel method steps in process of manufacturing curing bags of the class described. The invention is susceptible of numerous modifications other than those specifically described and illustrated, and the right is herein reserved to make such changes as fall within the scope of the appended claims without departing from the spirit of the invention.

I claim:

1. The process of restoring a rubber curing bag for pneumatic tires using a curing bag that has been used in service and has increased in its outside cross-sectional contour length, comprising the steps of removing a strip from the crown of the tread of said bag, said strip being of a width substantially equal to the amount of growth of said contour, joining the edges of the opening left by the removal of said strip, reinforcing the joint of said edges with vulcanizable rubber compound, and curing the assembly in a curing mold whereby a curing bag is produced whose said contour length is substantially less than that of the said bag from which said strip was removed.

2. The process of restoring a curing bag, comprising the removal of a longitudinal circumferential strip from a curing bag that has been used in curing a tire and has increased in size, joining the edges of the opening left by the removal of said strip, reinforcing the joint of said edges with a strip of vulcanizable rubber compound, and curing the assembly whereby the curing bag is restored to substantially its original contour.

3. The method of restoring an annular expansible core employed for vulcanizing tires which has become permanently distended by use, said method comprising the steps of removing a longitudinal circumferential section from the wall of said core, at least partially closing the opening left by the removal of said section by moving the edges of said opening toward each other a predetermined distance, placing a strip of vulcanizable rubber over the said edges throughout their length, and vulcanizing the assembly whereby the curing bag is restored to substantially its original size.

JAMES E. CHARNES.